United States Patent [19]

Claas et al.

[11] Patent Number: 4,487,005
[45] Date of Patent: Dec. 11, 1984

[54] DRAWING ROLLER WITH CONTROLLED DRAWING FINGERS FOR AGRICULTURAL MACHINE

[75] Inventors: Helmut Claas; Heinrich Ostrup, both of Harsewinkel, Fed. Rep. of Germany

[73] Assignee: Claas OHG., Harsewinkel, Fed. Rep. of Germany

[21] Appl. No.: 405,337

[22] Filed: Aug. 5, 1982

[30] Foreign Application Priority Data

Aug. 5, 1981 [DE] Fed. Rep. of Germany ... 8122977[U]

[51] Int. Cl.³ .............................................. A01D 57/00
[52] U.S. Cl. ....................................... 56/14.5; 56/364
[58] Field of Search ...................... 56/364, 14.3, 14.4, 56/14.5; 198/669, 671

[56] References Cited

U.S. PATENT DOCUMENTS

| | | | |
|---|---|---|---|
| 2,463,061 | 3/1949 | Small | 56/364 |
| 2,653,701 | 9/1953 | Heth | 198/669 |
| 2,778,483 | 1/1957 | Nikkel | 198/669 |
| 2,893,537 | 7/1959 | Krahn | 56/364 |
| 2,895,590 | 7/1959 | Snow | 56/364 |
| 3,244,271 | 4/1966 | Wenning | 56/14.5 |

*Primary Examiner*—Jay N. Eskovitz
*Attorney, Agent, or Firm*—Michael J. Striker

[57] ABSTRACT

A drawing roller of a cutting trough of an agricultural machine, particularly a harvester thresher, has a drawing roller body rotatably mounted in a cutting trough, oppositely operating screw plates arranged at outer ends of the roller body, a plurality of controlled drawing fingers arranged on the roller body in a central region thereof, and at least one rigid driving member arranged on the roller body in the central region in addition to the controlled driving fingers.

6 Claims, 2 Drawing Figures

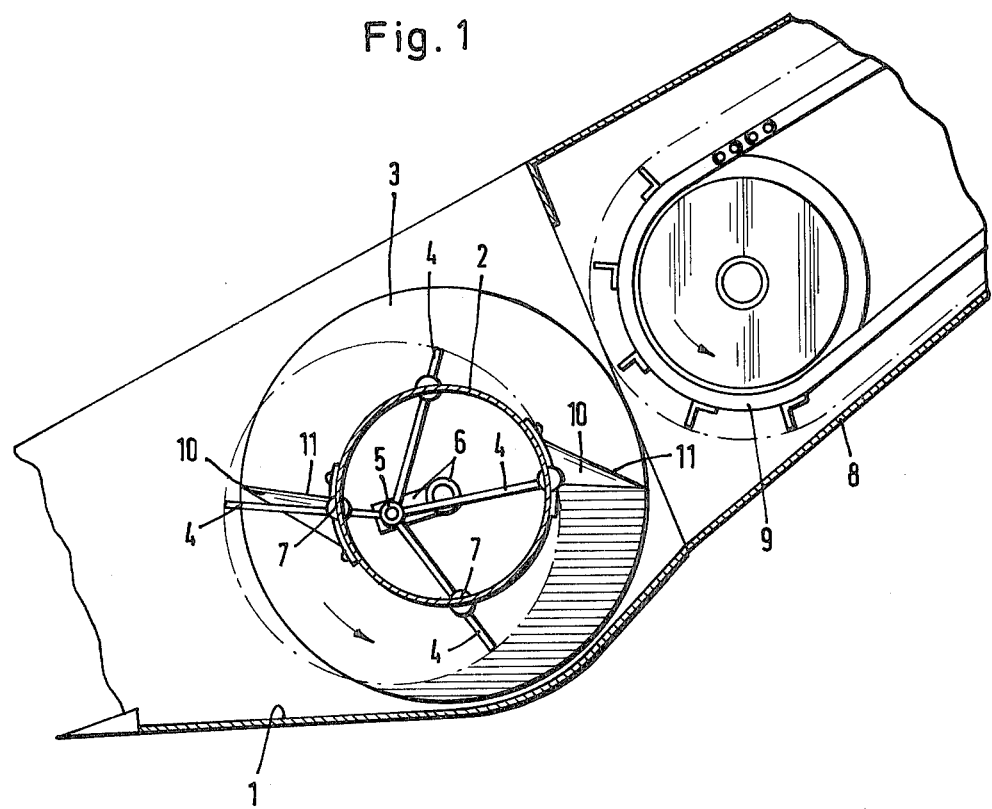
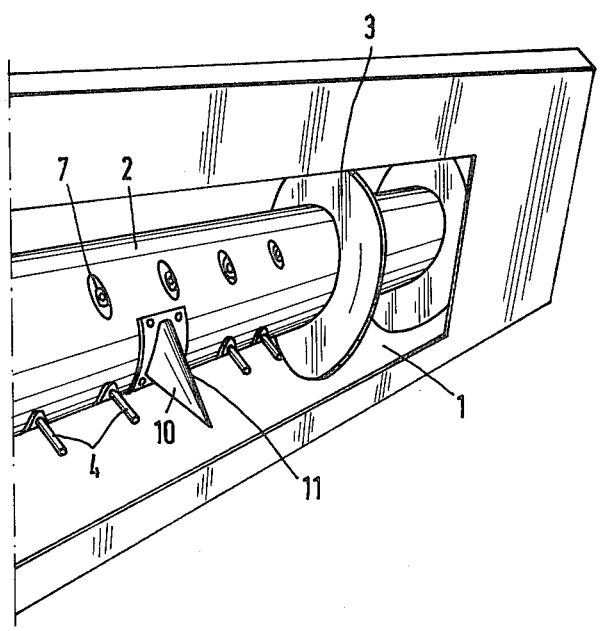

DRAWING ROLLER WITH CONTROLLED DRAWING FINGERS FOR AGRICULTURAL MACHINE

BACKGROUND OF THE INVENTION

The present invention relates to a drawing roller with controlled drawing fingers, for an agricultural machine, in particular a harvester thresher. More particularly, the invention deals with a drawing roller which is rotatably supported in a cutting trough of a harvester thresher and has outwardly arranged oppositely operating screw plates and a plurality of controlled drawing fingers located therebetween.

In such drawing rollers, the working region of the drawing fingers can be changed so that this working region can be directed more to the receipt of the product from the cutting trough or to the transfer of the product to the inclined conveyor and in dependence upon the product to be harvested. In some cases when the steam product height is very small, and moreover the product is very dry, the fingers must have simultaneously their optimum action both in the receiving region and the transferring region, which is not possible.

SUMMARY OF THE INVENTION

Accordingly, it is an object of the present invention to provide a drawing roller with controlled drawing fingers for an agricultural machine which satisfies simultaneously the requirement to provide for a good receipt of the products and a good discharge of the products in satisfactory manner.

In keeping with these objects, and with others which will become apparent hereinafter, one feature of the present invention resides, briefly stated, in a drawing roller in which in a central region in addition to the controlled fingers, at least one stationary driving member is provided.

Another feature of the present invention is that at least two stationary driving members can be provided in the central region in addition to the controlled fingers, and are offset relative to one another.

A uniform transfer of the product from the drawing roller to the inclined conveyor takes place when, in accordance with still another advantageous feature of the present invention, the driving xembers are arranged diametrically opposite to one another or so that their axes are offset relative to one another.

For providing effective transfer of the agricultural products by the driving member to the inclined conveyor, a further feature of the present invention is that the front surface of the driving member is inclined opposite to the direction of rotation of the drawing roller.

Finally, still a further feature of the present invention is that rubber paddles are connected with the driving members for increasing their front surface.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view of a drawing or feeding roller of a harvester thresher, in accordance with the present invention, shown in section; and FIG. 2 is a perspective view of the drawing roller of FIG. 1.

DESCRIPTION OF THE PREFERRED EMBODIMENT

The Figures show a cutting trough 1 of a not shown self-propelled harvester thresher with a driving roller 2 which is drivingly supported in the cutting trough 1.

Two outer end regions of the drawing roller 2 are provided with screw plates 3. The central region of the drawing roller 2 between the screw plate 3 has a plurality of controlled drawing fingers 4. The drawing fingers 4 are freely rotatable on a curved shaft part 5 of a stationary crankshaft 6 and extend through openings 7 in the drawing roller 2, outwardly.

The agricultural product tranposrted by both screw plates 3 toward the center of the drawing roller are engaged there by the drawing fingers 4 and transferred to a chain conveyor 9 supported in an inclined conveyor passage 8. In dependence upon the position of the crankshaft 6, the working region of the drawing finger 4 can be changed so that, for the receipt of the product, it is displaced from the cutting trough 1, or, for the transfer of the product to the chain conveyor 9, it is displaced more in the foreground.

In some cases, particularly in southern lands, there are frequently grain products for which both extreme positions simultaneously must be available. More particularly, this takes place when the height of the stem product is very small and moreover the product is brittle. Since both extreme positions in the working region of the drawing finger are simultaneously not possible, in practice the working region is so adjusted that to first of all guarantee the receipt of the product by the cutting trough 1. As a result of this, the finger 2 is completely withdrawn into the drawing roller 2 in the region in which the transfer of the product from the drawing fingers to the chain conveyor 9 takes place. Thereby a continuous transfer takes place only in the event when the product forms a composite mat. When, however, the agricultural product is short and dry, no composite mat is formed. Because of this during harvesting of such products there is a product piling in the transfer region to the chain conveyor 9, breaking of the brittle product, and simultaneous coating of the chain conveyor 9.

For preventing the above-mentioned disadvantages, the drawing roller 2 in accordance with the present invention is provided, additionally to the controlled drawing fingers 4, with two stationary driving xembers identified by reference numeral 11. The driving members 11 are arranged diametrically opposite to one another, or such that their axes are offset from one another. The driving members 11 are operative for transferring the product to the chain conveyor 9. For guaranteeing that the agricultural product is not driven from the driving members 10 over the transfer region outwardly whereby a wound coil can form, the driving member 10 or its front surface 11 is considerably inclined opposite to the direction of rotation of the drawing roller 2.

The driving members 10 have a maximum height corresponding to the height of the screw plates and thereby has a constant circumferential speed corresponding to the circumferential speed of the latter. In the event of fall-out-susceptible products, i.e. such products in which the grain falls out of the ears, or the like, it is advantageous when the front surface 11 of the stationary driving member is increased, for providing further transportation of the grain felled off during the cutting and drawing. It is advantageous when the front surface 11 is increased by mounting rubber paddles on the driving members 10, when it is necessary on the above mentioned grounds.

It will be understood that each of the elements described above, or two or more together, may also find a useful application in other types of constructions differing from the types described above.

While the invention has been illustrated and described as embodied in a drawing roller for a cutting trough of an agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A drawing roller of a cutting trough of an agricultural machine, particularly a harvester thresher, comprising a drawing roller body rotatably mounted in a cutting trough and having a central region and two other ends; oppositely operating screw plates arranged at said outer ends of said roller body; a plurality of controlled drawing fingers arranged on said roller body in said central region, said drawing fingers being substantially effective for high product, but in the event of harvesting of low and dry product being usually adjustable to provide optimal receipt of the low and dry product into the trough, which however leads to insufficient low and dry product discharge; and at least one rigid driving member arranged on said roller body in said central region in addition to said controlled driving fingers, said driving member being substantially not effective for high product, but being effective for discharge of low product, so that the same roller having a simultaneously said drawing fingers and said driving member is usable effectively for both low and high products.

2. A drawing roller as defined in claim 1, wherein a plurality of such rigid driving members are arranged on said roller body between said screw plates.

3. A drawing roller as defined in claim 2, wherein said driving members are arranged on said roller body so that their axes are offset relative to one another.

4. A drawing roller as defined in claim 1, wherein said roller body is rotatable in a predetermined direction, said driving member having a front surface which is inclined opposite to said direction of rotation of said roller body.

5. A drawing roller as defined in claim 1, wherein said driving member has a front surface; and further comprising a rubber paddle connected with said driving member for increasing said front surface of the latter.

6. A drawing roller of a cutting trough of an agricultural machine, particularly a harvester thresher, comprising a drawing roller body mounted rotatable in a predetermined direction in a cutting trough and having a central region and two outer ends; oppositely operating screw plates arranged at said outer ends of said roller body; a plurality of controlled drawing fingers arranged on said roller body in said central region, said drawing fingers being substantially effective for high product, but in the event of harvesting of low and dry product being usually adjustable to provide optimal receipt of the low and dry product into the trough, which however leads to insufficient low and dry product discharge; and a plurality of rigid driving members arranged on said roller body in said central region in addition to said controlled driving fingers and being substantially not effective for high product, but being effective for discharge of low product, so that the same roller having a simultaneously said drawing fingers and said driving member is usable effectively for both low and high products, said rigid driving members being arranged on said roller body diametrically opposite to one another so that their axes are offset relative to one another and having a front surface which is inclined opposite to said direction of rotation of said roller body.

* * * * *